United States Patent [19]

Soo-Hoo et al.

[11] Patent Number: 4,953,356
[45] Date of Patent: Sep. 4, 1990

[54] GEOTHERMAL REBOILER APPARATUS AND METHOD

[75] Inventors: Randall Soo-Hoo, San Francisco; August D. Benz, Hillsborough, both of Calif.

[73] Assignee: Bechtel Group, Inc., San Francisco, Calif.

[21] Appl. No.: 345,917

[22] Filed: May 1, 1989

[51] Int. Cl.$^5$ .............................................. F05G 7/00
[52] U.S. Cl. .................................................. 60/641.5
[58] Field of Search ................... 60/641.2, 641.4, 641.5

[56] References Cited

U.S. PATENT DOCUMENTS

| | | | |
|---|---|---|---|
| 4,244,190 | 1/1981 | Lieffers | 60/641.5 |
| 4,319,895 | 3/1982 | Kemmer | 60/641.5 |
| 4,534,174 | 8/1985 | Awerbuch et al. | 60/641.5 |

Primary Examiner—Allen M. Ostrager
Attorney, Agent, or Firm—Townsend and Townsend

[57] ABSTRACT

Apparatus and method for handling geothermal brine containing high non-condensible gas concentrations. The brine is directed into a pre-flash chamber where a vapor fraction is separated from a liquid fraction, the vapor fraction including steam and a non-condensible gas. The vapor fraction is directed into and through a reboiler in countercurrent flow relationship to a condensate. This action causes the steam of the vapor fraction to be stripped from the non-condensible gas and also causes the condensate to be heated by the steam. The non-condensible gas flows out of the reboiler to a gas expander collection station, or to the atmosphere while the condensate flows to a first flash chamber where it flashes to obtain clean steam for driving a first work producing apparatus, such as a turbine. The condensate from the first flash chamber is partially returned by a pump to a condensate inlet of the reboiler to form a closed system. The remainder of the condensate from the first flash chamber is directed to a second flash chamber where it flashes to form clean steam for driving a second work producing apparatus. The condensate from the second flash chamber is directed to another inlet of the reboiler.

12 Claims, 1 Drawing Sheet

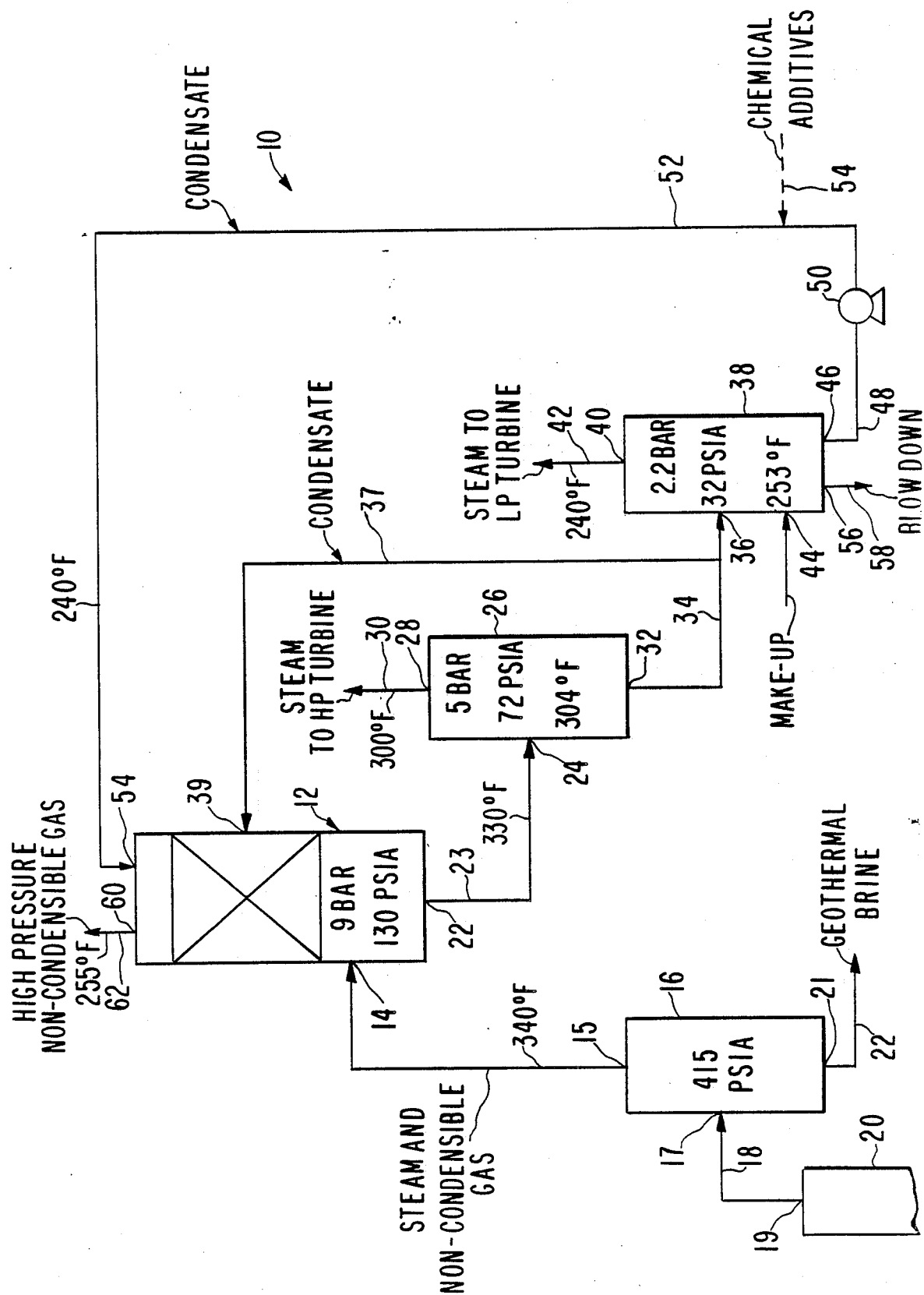

GEOTHERMAL REBOILER APPARATUS AND METHOD

This invention relates to improvements in reboiler apparatus and method in which energy is extracted from geothermal brine under high pressures and temperatures.

BACKGROUND OF THE INVENTION

In U.S. Pat. No. 4,534,174 there is disclosed an apparatus and method for handling geothermal brine from geothermal sources in such a way that the energy content is extracted from the geothermal brine and used to perform useful work.

In the patent, there is disclosed the method in which brine from a geothermal well is pre-flashed to separate the liquid and vapor fractions of the brine, the vapor fraction including steam and non-condensible gases. The vapor fraction is sent to a direct contact reboiler where the steam is used to heat a relatively cool condensate flowing through the reboiler, and the non-condensible gases are cooled and separated from the steam.

Heated condensate flowing out of the direct contact reboiler can be flashed in a first flash chamber to provide steam to drive a high pressure turbine. Condensate from the first flash chamber is directed to a second flash chamber to provide steam to drive a low pressure turbine. Then the condensate from the second flash chamber is recirculated back to the direct contact reboiler to provide a substantially closed system.

It has been found that the system can be made more efficient by additional handling of the condensate from the first flash chamber. The present invention is therefore based upon this concept.

SUMMARY OF THE INVENTION

The present invention is directed to apparatus and method for extracting energy from geothermal brine wherein the apparatus is similar in construction to the apparatus of U.S. Pat. No. 4,534,174 but the apparatus directs a portion of the condensate from the first flash chamber to an inlet of the direct contact reboiler to more successfully use the energy content of the condensate flowing from the first chamber to the second flash chamber. In this way, the system of the present invention is rendered more efficient than that of U.S. Pat. No. 4,534,174 so that a greater amount of energy can be realized with a minimum flow of geothermal brine through the system. The primary object of the present invention is to provide an improved apparatus and method for handling geothermal brine wherein condensate from a direct contact reboiler is sent successively through a pair of flash chambers for extracting pure steam from the condensate and wherein a portion of the condensate flowing from the first flash chamber to the second flash chamber is directed to the direct contact reboiler to render the system more efficient and to utilize the system for producing pure steam for driving work-producing apparatus, such as turbines and the like.

Other objects of this invention will become apparent as the following specification progresses, reference being made to the single Figure which shows a schematic diagram of the apparatus of the invention.

DETAILED DESCRIPTION OF THE PREFERRED EMBODIMENT

The energy recovery apparatus of the present invention is broadly denoted by the numeral 10 and includes a direct contact reboiler 12 having a first fluid inlet 14 for receiving flashed vapor from the outlet 15 of a flash chamber 16 whose inlet 17 is coupled by a pipe 18 to the outlet 19 of a geothermal well 20. Flash chamber 16 has a second outlet 21 coupled by a pipe 23 to other equipment (not shown) for further processing of the liquid fraction of brine leaving flash chamber 16.

Direct contact reboiler 12 has a lower fluid outlet 22 coupled by a pipe 23 to an inlet 24 of a first flash chamber 26. Steam flashed in first flash chamber 26 is directed out of chamber 26 through a first outlet pipe 28 thereof through pipe 30 to a work producing apparatus, such as a high pressure turbine.

A second outlet 32 of first lash chamber 26 is coupled by a pipe 34 to an inlet 36 of a second flash chamber 38 having a first outlet 40 coupled by a pipe 42 to a second work producing apparatus, such as a low pressure turbine. A portion of the fluid passing through pipe 34 is directed through a pipe 37 to a first upper inlet 39 of reboiler 12. A pump (not shown) may be used to pump a portion of the fluid flowing through pipe 34 into and through pipe 37 to inlet 39 of reboiler 12.

Flash chamber 38 has a second inlet 44 to permit make-up water to be added to the system. It also has a second outlet 46 coupled by a pipe 48 to a pump 50 for pumping liquid condensate through a pipe 52 to a second upper inlet 54 of direct contact reboiler 12. A third outlet 56 of flash chamber 38 is coupled to a pipe 58 to allow blowdown of chlorides and other carry over material from flash chamber 38.

Reboiler 12 has a second outlet 60 at the upper end thereof. Outlet 60 is coupled with a pipe 62 for directing the high pressure, non-condensible gases out of the system to the atmosphere or to a suitable collector for energy recovery by gas expander or by ejectors. The non-condensible gases can be directed to chemical or mineral recovery or disposal by injecting the gas into geothermal brine.

Chemical additives can be put into the system, if desired. For instance, chemical additives could be directed into pipe 52 from a pipe 55. The additives could be additives at other locations, if desired.

In operation, geothermal brine in a heated condition is flashed into flash chamber 16 and caused to flash, the liquid fraction flowing out of the flash chamber through outlet 21 to pipe 22, and the vapor fraction being directed out of flash chamber 16 through outlet 15 through direct contact reboiler 12. As the vapor fraction from chamber 16 flows upwardly and into direct contact reboiler 12, the steam contacts the condensate flowing downwardly in countercurrent relationship to the upwardly flowing vapor fraction. The steam condenses at it heats the condensate. Also the heat from the non-condensible gases is transferred to the condensate.

The non-condensible gases flow out of the direct contact reboiler 12 at a lower temperature than the temperature at which the vapor fraction enters direct contact reboiler 12. Typically, the temperature of the non-condensible gases as it leaves direct contact reboiler 12 through outlet 60 is about the same as the incoming condensate. Thus, the steam and non-condensible gases are separated from each other in a direct contact reboiler and the steam heats the condensate to a relatively high temperature so that it will flash when it expands in flash chamber 26.

The heated condensate travels out of reboiler 12 through pipe 23 and into flash chamber 26. In flash chamber 26, the condensate flashes to form clean steam which moves out of outlet 28 through pipe 30 to the first work producing apparatus, such as a high pressure turbine. The heated condensate leaves flash chamber 26 through outlet 32 thereof and a part of the heated condensate from chamber 26 flows through pipe 34 and into inlet 36 of flash chamber 38 and the remainder flows out of pipe 34, through pipe 37 to inlet 39 of reboiler 12.

In flash chamber 38, the condensate flashes once again to produce clean steam which is directed out of the flash chamber 38 through outlet 40 thereof and through pipe 42 to the second work producing apparatus, such as a low pressure turbine. The condensate in flash chamber 38 is pumped through line 52 back to inlet 54 of direct contact reboiler 12 by pump 50. Blowdown materials are directed out of flash chamber 38 through outlet 56 thereof.

The vapor entering direct contact reboiler 12 is super heated and the reboiler itself can be a tray or packed column. The heat of condensation of the steam in reboiler 12 in the sensible cooling of the noncondensible gases heats the condensate entering reboiler 12 through inlets 39 and 54.

Pure water or geothermal brine can be used for the direct contact process. Other solutions, such as NaCl solutions, could be used to reduce $CO_2$ solubility in a liquid. A single flash chamber, such as flash chamber 26 could be used, flash chamber 28 being eliminated, if desired. For extremely high $CO_2$ concentrations in the brine (about 4% by weight), the hot liquid can be pre-flashed to remove $CO_2$ before flashing the condensate for steam production. This could occur between outlet 22 of reboiler 12 and inlet 24 of flash chamber 26. Chemicals added through pipe 54 or pipe 52 are provided, if required, for environment and corrosion control.

Typical process conditions as to temperature and pressure using condensate in the reboiler system have the values as shown in the Figure. For particular operation, the geothermal brine exiting from well 20 was found to have a flow rate of 3,171,806 lbs/hr of water and 68,273 lbs/hr of carbon dioxide. This resulted in approximately 300,529 lbs/hr of water and 67,401 lbs/hr of carbon dioxide entering the direct contact reboiler at inlet 14 thereof. The remainder of the water and carbon dioxide flowed out of the pre-flash absorber 16 through pipe 21 and contained approximately $2.87 \times 10^6$ lbs/hr of water and 888 lbs/hr of carbon dioxide. At the outlet 28 of first flash chamber 26, the flashed vapor was equivalent to 198,779 lbs/hr of water and 4,165 lbs/hr of carbon dioxide. At outlet 40 of flash chamber 38, the flashed vapor was equivalent to 98,778 lbs/hr of water and 28 lbs/hr of $CO_2$. The condensate portion entering direct contact reboiler 12 along line 37 and inlet 39 was approximately $4.50 \times 10^6$ lbs/hr of water and 71 lbs/hr of carbon dioxide. The condensate flowing along line 52 to inlet 54 of direct contact reboiler 12 was approximately $1.60 \times 10^6$ lbs/hr of water and 0.2 lbs/hr of carbon dioxide.

What is claimed:

1. Apparatus for handling a geothermal brine capable of being flashed to form a vapor fraction containing steam and a non-condensible gas comprising:
   a direct contact reboiler;
   means coupled with the reboiler for directing the vapor fraction of flashed geothermal brine into the reboiler;
   a first flash chamber;
   means coupling the reboiler with the first flash chamber to allow a heated condensate from the reboiler to flow to said first flash chamber whereby the condensate will flash in the first flash chamber to produce clean steam which can be used for driving a first work-producing device;
   a second flash chamber;
   a first fluid line coupling the first flash chamber with the second flash chamber to allow the second flash chamber to receive condensate from the first flash chamber, whereby the condensate flashed in a second chamber can be turned into pure steam for use in operating a second work-producing device, there being a second fluid line coupled to said first fluid line for directing a portion of the condensate from the first flash chamber to the reboiler; and
   means for coupling the second flash chamber to the reboiler for directing condensate from the second flash chamber to the reboiler.

2. Apparatus as set forth in claim 1, wherein is included means defining a pre-flash chamber having a fluid inlet adapted to be coupled to a source of geothermal brine and an outlet, and means coupling the outlet of the chamber with the reboiler for directing flashed geothermal brine thereto.

3. Apparatus as set forth in claim 1, wherein the reboiler has a first outlet for removal of non-condensible gases therefrom and a second outlet for removal of heated condensate therefrom, the second outlet being below the first outlet and coupled with the first flash chamber.

4. Apparatus as set forth in claim 1, wherein the reboiler has a first inlet near the lower end of the reboiler for receiving flashed geothermal steam, a pair of second inlets near the upper end of the reboiler for receiving condensate, a first outlet near the upper end thereof for directing a non-condensible gas out of the reboiler, and a second outlet near the lower end of the reboiler for directing heated condensate out of the reboiler to the first flash chamber.

5. Apparatus as set forth in claim 1, herein is included means for directing make-up water into one of the flash chambers.

6. Apparatus as set forth in claim 1, wherein the second flash chamber has means for directing blowdown material out of the same.

7. Apparatus as set forth in claim 1, wherein the reboiler has packing, perforated trays and bubble cups to provide countercurrent contact between condensate and the vapor fraction.

8. A method of handling a geothermal brine capable of being flashed to form a vapor fraction and a non-condensible gas comprising:
   flashing geothermal brine in a first zone;
   moving the vapor fraction of the flashed geothermal brine to a second zone; and into countercurrent heat exchange relationship to a fluid to separate the steam from the non-condensible gas and to heat the fluid;
   flashing the heated fluid in a third zone to provide pure steam in the fluid remainder;
   directing a first portion of the fluid remainder to the second zone;

using the pure steam from the third zone for driving a first work producing device;

directing a second portion of the fluid remainder to a fourth zone;

allowing the second portion of the fluid remainder to flash in the fourth zone;

using the pure steam flashed in the fourth zone for driving a second work producing device; and directing the fluid remainder from the fourth zone to the second zone to provide a second part of the fluid passing through the second zone.

9. A method as set forth in claim 8, wherein is included the step of exhausting the non-condensible gas after it has been separated from the steam.

10. A method as et forth in claim 8, wherein is included the step of inserting chemical additives into the system.

11. A method as set forth in claim 8, wherein the fluid is defined as including water, condensate, brine and organic and inorganic materials.

12. A method as set forth in claim 8, wherein the fluid is defined as including a solid contained in a liquid.

* * * * *